(12) United States Patent
Manna et al.

(10) Patent No.: US 12,339,888 B2
(45) Date of Patent: Jun. 24, 2025

(54) UNIFIED INSIGHTS ENGINE

(71) Applicant: PHOTON INSIGHTS, INC., West Conshohocken, PA (US)

(72) Inventors: Arnab Manna, Kolkota (IN); Hari Ravi, West Windsor, NJ (US)

(73) Assignee: PHOTON INSIGHTS, INC., West Conshohocken, PA (US)

( * ) Notice: Subject to any disclaimer, the term of this patent is extended or adjusted under 35 U.S.C. 154(b) by 0 days.

(21) Appl. No.: 18/229,564

(22) Filed: Aug. 2, 2023

(65) Prior Publication Data

US 2025/0045318 A1 Feb. 6, 2025

(51) Int. Cl.
*G06F 16/34* (2025.01)
*G06F 40/205* (2020.01)
*G06F 40/40* (2020.01)

(52) U.S. Cl.
CPC .......... *G06F 16/345* (2019.01); *G06F 40/205* (2020.01); *G06F 40/40* (2020.01)

(58) Field of Classification Search
CPC ....... G06F 16/345; G06F 40/205; G06F 40/40
See application file for complete search history.

(56) References Cited

U.S. PATENT DOCUMENTS

| | | | | |
|---|---|---|---|---|
| 7,966,316 B2* | 6/2011 | Cao | | G06F 16/345 |
| | | | | 707/721 |
| 11,651,039 B1* | 5/2023 | Soubbotin | | G06F 16/93 |
| | | | | 707/706 |
| 11,875,130 B1* | 1/2024 | Bosnjakovic | | G06N 3/0475 |
| 12,038,958 B1* | 7/2024 | Soubbotin | | G06F 16/335 |
| 2014/0040281 A1* | 2/2014 | Spivack | | H04L 51/52 |
| | | | | 707/748 |
| 2024/0185305 A1* | 6/2024 | Barrett | | G06F 40/40 |
| 2024/0311402 A1* | 9/2024 | Baeuml | | G06F 16/3322 |

OTHER PUBLICATIONS

Python, Langchain, "QA over Documents", Web Page downloaded at <https://web.archive.org/web/20230731153312/https://python.langchain.com/docs/use_cases/question answering/>. Retrieved from the Internet on Dec. 8, 2023.
Liu et al., "BRIO: Bringing Order to Abstractive Summarization" arXiv:2203.16804v1 [cs.CL] Mar. 31, 2022.
Lewis et al., "BART: "Denoising Sequence-to-Sequence Pre-training for Natural Language Generation, Translation, and Comprehension. arXiv:1910.13461v1 [cs.CL] Oct. 29, 2019.
Reimers et al., "Sentence-BERT: Sentence Embeddings using Siamese BERT-Networks" arXiv:1908.10084v1 [cs.CL] Aug. 27, 2019.

(Continued)

*Primary Examiner* — Cao H Nguyen
(74) *Attorney, Agent, or Firm* — MARSHALL, GERSTEIN & BORUN LLP

(57) ABSTRACT

Systems and methods disclosed herein relate generally to providing a media abstract for a selected topic. The media abstract may include information obtained from a plurality of media sources. Providing the media abstract may include periodically retrieving data from a plurality of media sources, saving the data in a data store, retrieving the data from the data store, generating for each topic of a plurality of topics, a media abstract that includes a plurality of text segments transforming the data, receiving a selected topic from a client device, and transmitting the media abstract corresponding to the selected topic to the client device.

16 Claims, 7 Drawing Sheets

(56) References Cited

OTHER PUBLICATIONS

McInnes et al., "UMAP: Uniform Manifold Approximation and Projection for Dimension Reduction" arXiv:1802.03426v3 [stat. ML] Sep. 18, 2020.

Ester et al., "A Density-Based Algorithm for Discovering Clusters in Large Spatial Databases with Noise" Proceedings of 2nd International Conference of Knowledge Discovery and Data Mining (KKD-96), 1996.

Dogu Araci., "FinBERT: Financial Sentiment Analysis with Pre-trained Language Models" arXiv:1908.10063v1 [cs.CL] Aug. 27, 2019.

Radford et al., Robust Speech Recognition via Large-Scale Weak Supervision, arXiv:2212.04356 [eess.AS], Dec. 6, 2022.

Tan et al.," Summarizing Text on Any Aspects: A Knowledge-Informed Weakly-Supervised Approach", r arXiv:2010.06792v2 [cs.CL], Oct. 18, 2020.

Fabbri et al.," SummEval: Re-evaluating Summarization Evaluation", arXiv:2007.12626v4 [cs.CL], Feb. 1, 2021.

Devlin et al., "BERT: Pre-training of Deep Bidirectional Transformers for Language Understanding", arXiv:1810.04805v2 [cs.CL], May 24, 2019.

Vaswani et al., "Attention Is All You Need" arXiv:1706.03762v6 [cs.CL], Jul. 24, 2023.

\* cited by examiner

United States Patent US 12,339,888 B2

UNIFIED INSIGHTS ENGINE

FIELD OF THE INVENTION

The present disclosure generally relates to using a language model to generate media abstracts from a plurality of sources.

BACKGROUND

Generative pre-trained transformers (GPTs), such as ChatGPT, use deep learning to produce natural language output texts, including text summarizations, based upon a given input. As indicated by the term "pre-trained," GPTs are trained on massive datasets of human-generated text prior to public release. One consequence of the pre-training is that GPTs do not have knowledge of information and events that occurred after the training, and thus cannot provide summaries of current events. Further, conventional GPTs do not provide transparent interpretability as to how the output text was generated.

Abstractive text summarizers paraphrase and transform input text using natural language processing. Conventional abstractive text summarizers have difficulty consolidating and unifying information from a plurality of sources. Further, conventional abstractive text summarizers are limited to processing text data.

SUMMARY

The present embodiments may relate to, inter alia, systems and methods for generating a media abstract from a plurality of sources using a language model.

In one aspect, a system for providing a media abstract for a selected topic, wherein the media abstract includes information obtained from a plurality of media sources may be provided. The system may include a server comprising one or more processors and a memory storing a data collection service and a language model service trained on a plurality of data sources. For example, in one instance, the data collection service, when executed, may cause the one or more processors to: (1) periodically retrieve data from the plurality of media sources; and (2) save the data in a data store. The language model service, when executed, may cause the one or more processors to: (3) receive a selected topic from a client device; (4) retrieve the data from the data store; (5) generate one or more media abstracts for one or more topics comprising a plurality of text segments transforming the data, wherein the one or more media abstracts comprise a generated sequence of text that is new compared to the information in the plurality of media sources; and (6) transmit the media abstract corresponding to the selected topic to the client device. The system may include additional, less, or alternate functionality, including that discussed elsewhere herein.

In another aspect, a computer-implemented method for providing a media abstract for a selected topic, wherein the media abstract includes information obtained from a plurality of media sources may be provided. The computer-implemented method may be implemented via one or more local or remote processors, servers, memory units, mobile devices, laptops, desktops, smart watches, and/or other electronic or electrical components, which may be in wired or wireless communication with one another. For example, in one instance, the computer-implemented method may include: (1) periodically retrieving, with one or more processors, data from a plurality of media sources; (2) saving, with the one or more processors, the data in a data store; (3) receiving, with the one or more processors, a selected topic from a client device; (4) retrieving, with the one or more processors, the data from the data store; (5) generating, with the one or more processors, one or more media abstracts for one or more topics comprising a plurality of text segments transforming the data, wherein the one or more media abstracts comprise a generated sequence of text that is new compared to the information in the plurality of media sources; and (6) transmitting, with the one or more processors, the media abstract corresponding to the selected topic to the client device. The method may include additional, less, or alternate functionality or actions, including those discussed elsewhere herein.

In addition, the language model-based systems and methods include improvements in computer functionality at least because the generated media abstracts consolidates and compresses information from a plurality of sources into a concise summary, and thus decrease demands on the client device(s), server device(s), and network. That is, instead of each user visiting and/or loading each of a plurality of sources in order to retrieve relevant information, the disclosed systems and methods retrieve the information from the plurality of sources and provide the compressed summaries to the users. This results in less demand on the servers providing the plurality of sources, the client devices requesting the information, and on the network. Additionally, the language models may be trained and/or finetuned and thus may learn and improve their media abstract answer generation capabilities over time.

In addition, the present disclosure includes specific features other than what is well-understood, routine, conventional activity in the field, or adding unconventional steps that confine the claim to a particular useful application, e.g., language model-based systems and methods for generating media abstracts, as further described herein.

Additional, alternate and/or fewer actions, steps, features and/or functionality may be included in an aspect and/or embodiments, including those described elsewhere herein.

BRIEF DESCRIPTION OF THE DRAWINGS

The figures described below depict various aspects of the applications, methods, and systems disclosed herein. It should be understood that each figure depicts one embodiment of a particular aspect of the disclosed applications, systems, and methods, and that each of the figures is intended to accord with a possible embodiment thereof. Furthermore, wherever possible, the following description refers to the reference numerals included in the following figures, in which features depicted in multiple figures are designated with consistent reference numerals.

Advantages will become more apparent to those skilled in the art from the following description of the preferred embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive.

DETAILED DESCRIPTION

Overview

The systems and methods disclosed herein generally relate to, inter alia, generating a media abstract from a plurality of sources using a language model. Some embodiments may include one or more of: requesting, providing, and receiving a media abstract for a selected topic that includes information from a plurality of media sources.

Exemplary Computing Environment

Figure 1:
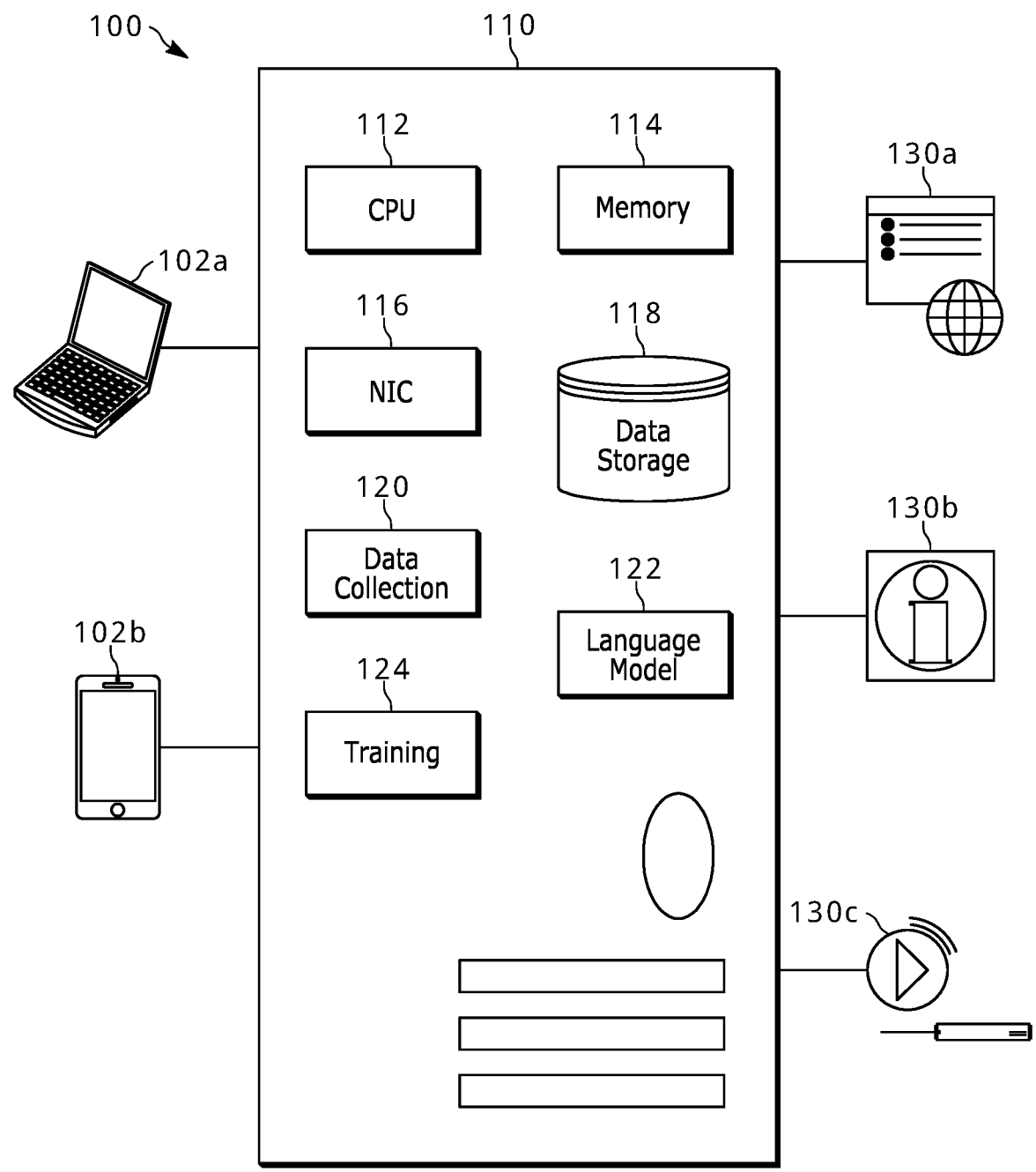
FIG. 1 illustrates an exemplary computing environment for requesting, generating, and receiving media abstracts.

FIG. 1 illustrates an exemplary computing environment 100 in which methods and systems for requesting, generating, and receiving abstracts may be performed, in accordance with various aspects discussed herein.

As shown in FIG. 1, the computing environment 100 may comprise one or more client devices 102. The client devices 102 may be desktop computers, laptop computers, server computers, tablets, smartphones, smart watches, or any other suitable device. The client devices 102 may include a memory and a processor for storing and executing one or more applications. The client devices 102 may include one or more network interfaces. The network interfaces may provide wired connectivity, such as Ethernet, and/or wireless connectivity, such as WiFi or cellular.

In one aspect, the computing environment 100 may comprise one or more servers 110. The server 110 may include on-premises hardware or hardware in a cloud environment. The server 110 may comprise one or more virtual machines. The server 110 may include one or more central processing units (CPU) 112. The CPU 112 may comprise one or more CPUs, graphics processing units (GPU), application specific integrated circuits (ASIC), field programmable gate arrays (FPGA), or any other processing unit. The CPU 112 may execute a data collection service 120, a language model service 122, and/or a training service 124. The server 110 may include memory 114. The memory 114 may include transitory memory, such as random access memory (RAM) or cache, and non-transitory memory, such as basic input/output system (BIOS), flash memory, magnetic hard drives, and solid-state drives. The memory 114 may store a data collection service 120, a language model service 122, and/or a training service 124. The server 110 may include one or more network interface cards (NIC) 116. The NIC 116 may provide wired connectivity, such as Ethernet or WAN. The NIC 116 may provide wireless connectivity, such as WiFi or cellular. The server 110 may run an operating system, such as Microsoft Windows or Linux. The server 110 may include data storage 118. The data storage 118 may comprise a database, such as a relational database or a vector database.

The data collection service 120, language model service 122, and/or training service 124 may be implemented in any programming language, e.g., Python, C, C++, HTML, JavaScript, etc. The data collection service 120, language model service 122, and/or training service 124 may be implemented as compiled executables and libraries and/or interpretable source code. The language model service 122 may include a machine learning (ML) based library or package, such as TensorFlow, PyTorch, HuggingFace, and/or scikit-learn.

In one aspect, the computing environment 100 may comprise one or more information sources 130, such as media websites 130a, public information sources 130b, and/or streaming media sites 130c.

The server 110 may communicate with client devices 102 and information sources 130 over local area networks, wide area networks, public networks, such as the Internet, and/or private networks. The server 110 may communicate using standard protocols, such as HTTP or HTTPS, and/or proprietary protocols.

Exemplary Backend Environment

Figure 2:
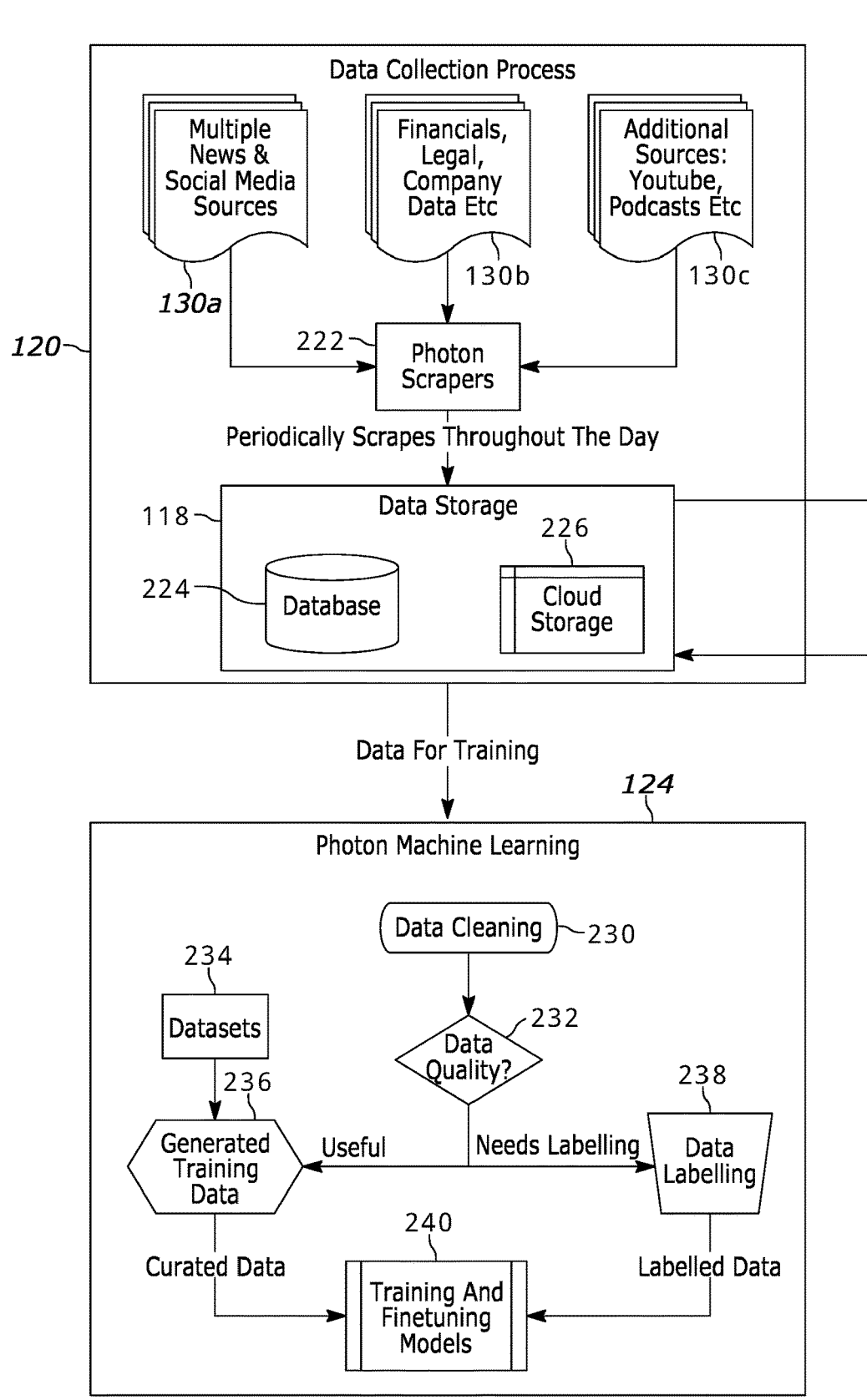
FIG. 2 illustrates an exemplary backend system for generating media abstracts.
Figure 2:
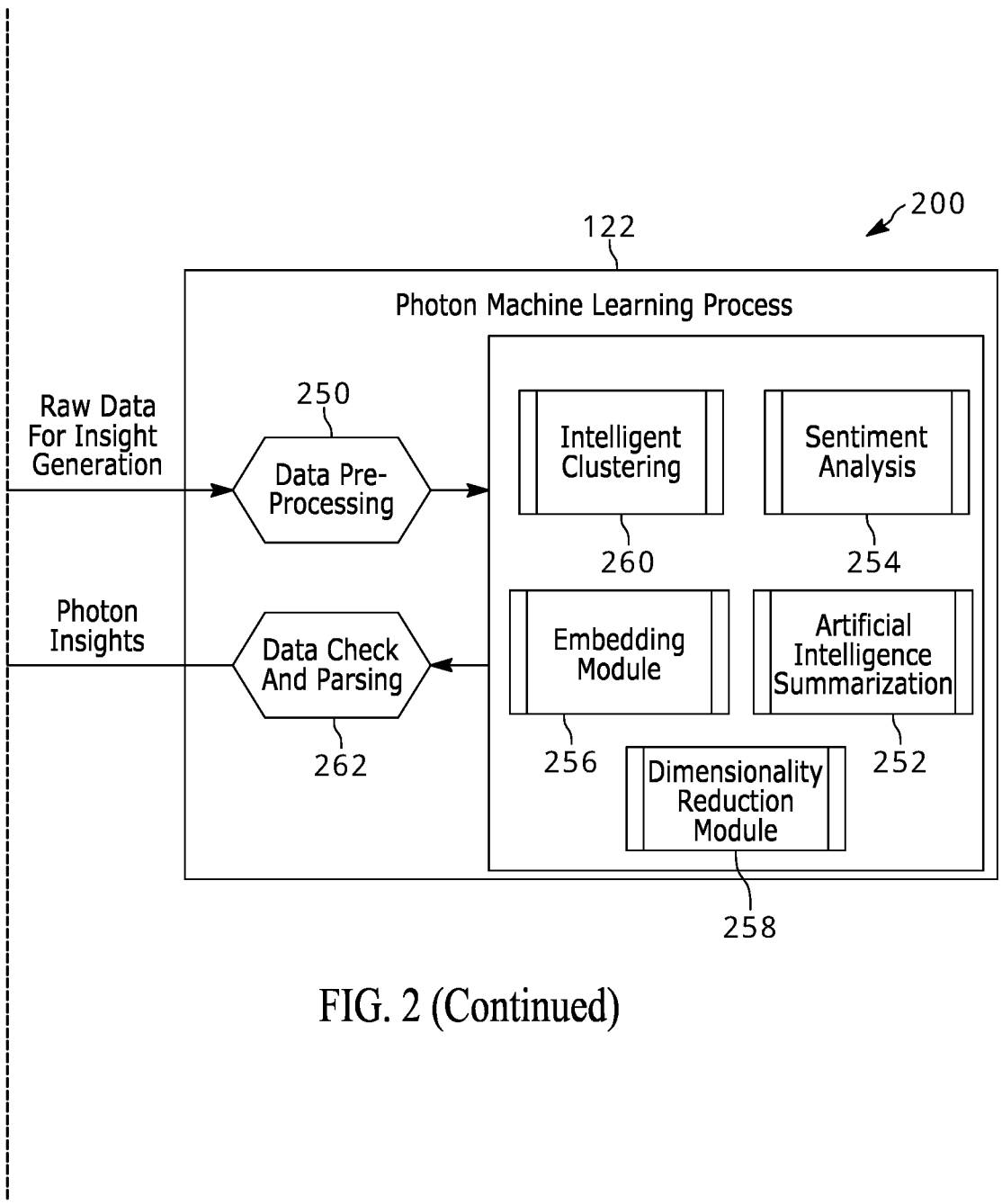

FIG. 2 illustrates an exemplary backend environment 200 in which methods and systems for generating media abstracts may be performed, in accordance with various aspects discussed herein. The backend environment 200 may be implemented on one or more servers 110.

In one aspect, the backend environment 200 may include the data collection service 120. The data collection service 120 may include a photon scraper module 222. The photon scraper module 222 may periodically, i.e., several times per day, retrieve text from a plurality of information sources 130. The information sources 130 may include media websites 130a, e.g., news and social media sites, public information sources 130b, e.g., financials, legal, company data, etc., and streaming media sites 130c, e.g., YouTube, podcasts, etc. The retrieved data may comprise text scraped from the information sources 130. For audio or video-based sources, e.g., streaming media sites 134, the photon scraper module 222 may transcribe the audio or video data into text data. The photon scraper module 222 may save the retrieved data into data storage 118. The data storage 118 may comprise one or more databases 224. The databases 224 may be stored on the one or more servers 110 or on another server. The data storage 118 may include cloud storage 226. The cloud storage 226 may comprise a public cloud, e.g., Amazon AWS, or a private cloud.

In one aspect, the backend environment 200 may include the language model service 122. The language model service 122 may comprise a data pre-processing module 250 for processing data retrieved from the data storage 118. The data pre-processing module 250 may split sentences into words (tokenization), remove special characters, convert uppercase letters in the words to lowercase, remove stop words, transform the words to their root form (stemming), and/or resolve the words to their lemmas (lemmatization).

The language model service 122 may include an artificial intelligence (AI) summarization module 252. The AI summarization module 252 may perform abstractive text summarization by identifying the most critical concepts in the original text and creating a new set of sentences for the summary. The summary may be less than 150 words. The AI summarization module 252 may summarize an individual text or a plurality of texts. The AI summarization module 252 may be implemented by a generic large language model (LLM), an encoder-decoder model, e.g., sequence-to-sequence (seq2seq), a transformer-based model, such as bidirectional encoder representations from transformers (BERT) and/or an autoregressive model, a long short-term memory (LSTM) model, e.g., decline curve analysis (DCA) or LEAD-3, a gated recurrent unit (GRU) model, or a convolutional neural network (CNN) model, e.g., dynamic convolutions.

The language model service 122 may include a sentiment analysis module 254. The sentiment analysis module 254 may determine whether the sentiment of a text is positive, negative, or neutral. The sentiment analysis module 254 may use transformer models, e.g., BERT, LLM, naïve Bayes, logistic regression, support vector machines, CNN, recurrent neural network (RNN), deep neural network, and/or other suitable techniques.

The language model service 122 may include an embedding module 256. The embedding module 256 apply may sentence transforms, e.g., sentence bidirectional encoder representations from transformers (SBERT), on aspect keywords, source text, summaries, and/or other input text to generate an embedding. The embeddings are dense vector representations of the input texts. For example, the embeddings may be of dimension 768.

The language model service 122 may include a dimensionality reduction module 258. The dimensionality reduction module 258 may reduce the dimensionality of the embeddings using an unsupervised learning technique, e.g., principal component analysis (PCA), linear discriminant analysis (LDA), generalized discriminant analysis (GDA), uniform manifold approximation and projection (UMAP), or other suitable techniques. For example, the 768 dimension embeddings may be reduced to dimension 5.

The language model service 122 may include an intelligent clustering module 260. The intelligent clustering module 260 may cluster embeddings into a number of groups. Each cluster or group may contain a set of all similar embeddings. Similarity may be determined by Euclidean distance, cosine similarity, dot product, random projection, product quantization, locality-sensitive hashing, nearest neighbor search, e.g., hierarchical navigable small world graphs (HNSW), or other suitable methods. The clustering module 260 may be implemented by centroid-based, density-based, e.g., density-based spatial clustering of applications with noise (DBSCAN), distribution-based, or hierarchical clustering.

The language model service 122 may include a data check and parsing module 262. The data check and parsing module 262 may assign a sequence to the words in a generated summary so that the summary makes sense syntactically and grammatically. The data check and parsing module 262 may be implemented using a recursive descent, shift-reduce, chart, or regular expression parser. The output of the data check and parsing module 262 may be stored in data storage 118.

In one aspect, the backend environment 200 may include the training service 124. The training service 124 may train, fine tune, and/or test one or more components of the language model service 122. The training service 124 may obtain training data from the data storage 118 or from datasets 234. The datasets 234 may include open source or proprietary sources of labeled data. The training data may include text from information sources and/or reference summaries of the information source text, e.g., the Extreme Summarization (XSum) or CNN/DailyMail datasets. The training data may include scores and sentiments assigned to the summaries.

The training service 124 may include a data cleaning module 230. The data cleaning module 230 may function similarly to the data pre-processing module 250. The data cleaning module 230 may tokenize, remove numbers and special characters, convert uppercase letters to lowercase, remove stop words, perform stemming, and/or lemmatize the training data.

The training service 124 may include a data quality module 232. The data quality module 232 may analyze cleaned data from the data cleaning module 230. The data quality module 232 may determine whether the cleaned data is labeled or unlabeled. Cleaned data that is labeled or data from datasets 234 is generated training data 236. Cleaned data that is unlabeled is labeled by the data labeling module 238. The data labeling module 238 may rely upon ML models, e.g., zero shot classification, and/or humans to label the data. The data labeling module 238 may label the utterances, intents, and/or entities of the data.

The training service 124 may include a training and finetuning module 240. The training and finetuning module 240 may use the generated training data 236 or the labeled data to train and/or fine tune one or more components of the language model 122. The training and finetuning module 240 may split the generated training data 236 or the labeled data into a training dataset, a validation dataset, and/or a test dataset. The training and finetuning module 240 may use maximum likelihood estimation (assuming a deterministic distribution) and/or contrastive learning (assuming a non-deterministic distribution) to train the language model 122. The training and finetuning module 240 may use sample texts and golden summaries to train the language model 122. Training the language model 122 may include hyperparameter grid search, gradient descent, regularization, and validation. The training and finetuning module 240 may fine tune weights of a neural-architecture or encoder-decoder framework of the language model 122. The training and finetuning module 240 may compare and automatically evaluate the quality of media abstracts generated by the language model 122 to human-produced reference summaries using Recall-Oriented Understudy for Gisting Evaluation (ROUGE) scores. The ROUGE scores may be used to finetune the language model 122. The training and finetuning module 240 may stop fine tuning the language model 122 once validation loss begins to increase to prevent overfitting. The training and finetuning module 240 may fine tune the sentiment analysis module 254 using domain-specific datasets and fine tune weights to minimize validation loss and properly classify as many examples as possible.

Exemplary Client Application

Figure 3A:
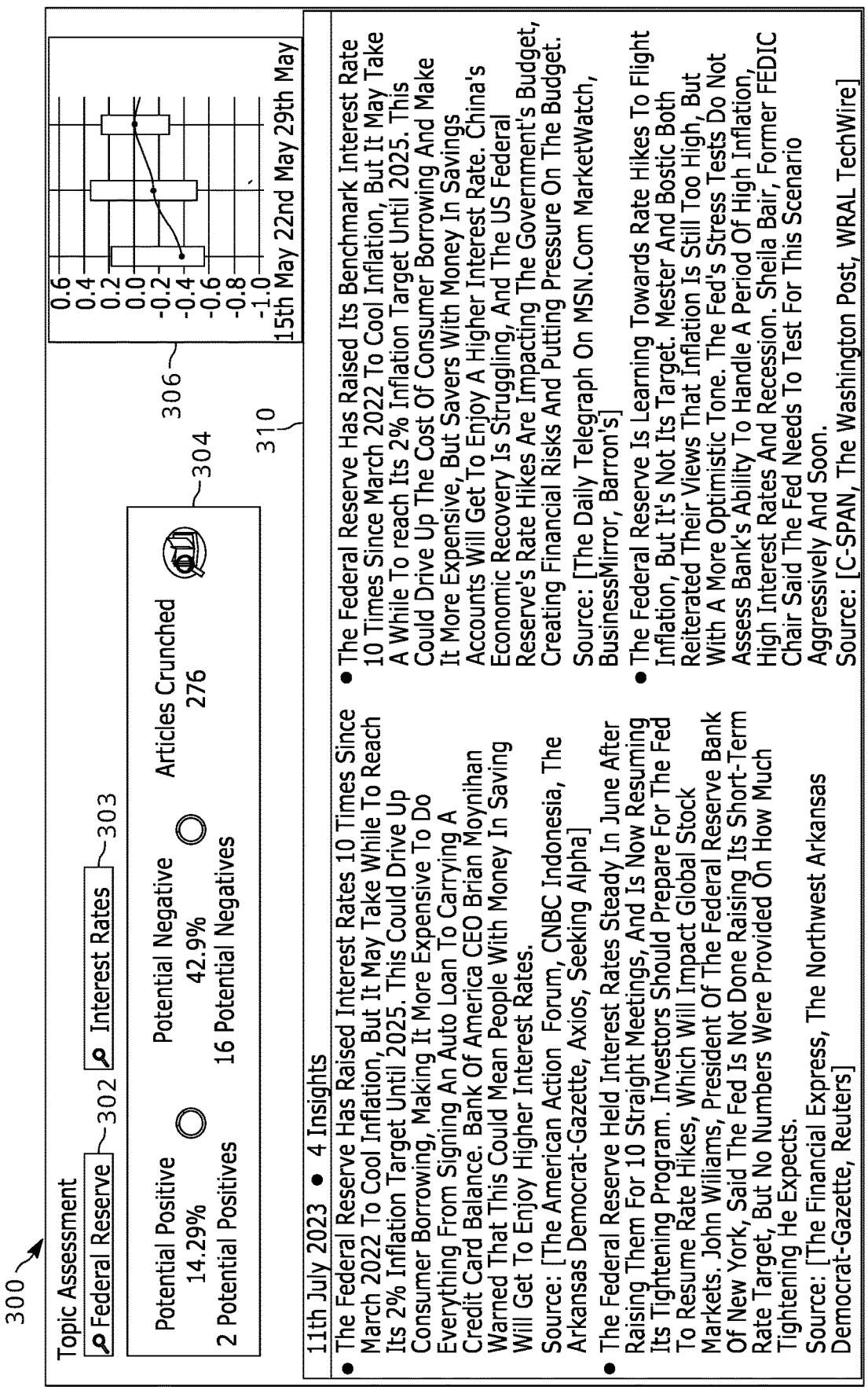
FIG. 3A illustrates a client application for requesting and receiving a media abstract.

FIG. 3A illustrates an exemplary client application 300 for requesting an receiving a media abstract, in accordance with various aspects discussed herein. The client application 300 may be executed on client devices 102 and displayed in the user interface. The client application 300 may be a web page, a web browser extension, a mobile application, or a desktop application.

In one aspect, when the client application 300 is executed, it may display a topic selection input 302. The topic selection input 302 allows the user to specify a topic for which a media abstract is requested. The topic selection input 302 may permit the user to type in one or more keywords comprising the desired topic, such as "Federal Reserve." The topic selection input 302 may display a pre-selected list or menu of topics.

When the client application 300 is executed, it may display an aspect selection input 303. The aspect selection input 303 allows the user to specify an aspect on which the media abstract will be generated for the desired topic. The aspect selection input 303 may permit the user to type in one or more keywords comprising the desired aspect, such as "Interest rates."

After the user selects the topic via the topic selection input 302 and, optionally, the aspect via the aspect selection input 303, the client application 300 transmits the topic and may transmit the aspect keywords to the server 110. The server 110 may transmit a pre-generated media abstract corresponding the topic to the client application 300. The server 110 may transmit a custom generated media abstract corresponding to the topic and aspect to the client application 300.

In one aspect, when the client application 300 receives the media abstract from the server 110, the client application 300 may display one or more of media abstract statistics 304, historical sentiment analysis 306, and media abstract output 310. The media abstract statistics 304 may comprise the number and/or percentage of positive and negative sentiments or a cumulative sentiment score for the information sources 130 for the selected topic. The media abstract statistics 304 may comprise the number of articles and/or the number of information sources 304 reviewed and/or summarized for the media abstract.

In one aspect, the historical sentiment analysis 306 may include sentiment data for the selected topic over a period of time. The historical sentiment analysis 306 may include the number and/or percentage of positive and negative sentiments or a cumulative sentiment score for the topic over a period of time, e.g., past week, month, quarter, etc. The historical sentiment analysis 306 may include bar charts, line graphs, or any other suitable means of displaying sentiment data trends.

In one aspect, the media abstract output 310 may display one or more media abstracts, i.e., "Insights," for the selected topic. The media abstracts may be 150 words or less. In one aspect, the media abstract output 310 may comprise audio transcribed from the media abstract text. Text segments of the media abstract may be highlighted or otherwise annotated to indicate potential positive or negative sentiments. The media abstract output 310 may include an identification of the information sources 130 that were summarized into the media abstracts. In one aspect, links to the original articles or other information sources for each text segment may be provided.

Exemplary Media Abstract

Figure 3B:
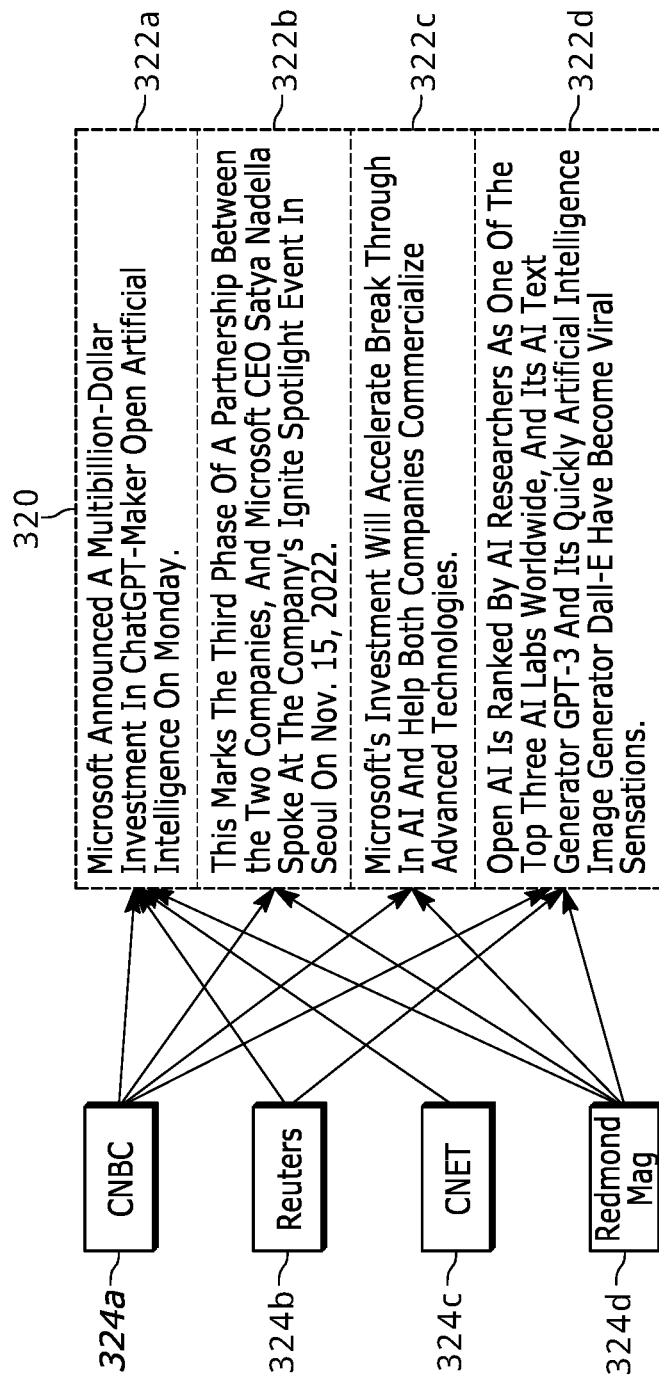
FIG. 3B illustrates an exemplary media abstract.

FIG. 3B illustrates an exemplary media abstract 320, in accordance with various aspects discussed herein. The media abstract 320 may be displayed in the media abstract output 310 of the client application 300. In one aspect, the media abstract 320 may be transmitted to client devices 102 via text message, e-mail, social media, or any other suitable means.

In one aspect, the media abstract 320 may comprise one or more text segments 322a-d. The text segments 322 may comprise sentences, groups of sentences, and/or groups of words. Each text segment 322 is an abstractive summary of one or more media sources 324. In the illustrated example, text segment 322a is a summary of media sources 324a, 324b, 324c, and 324d; text segment 322b is a summary of media sources 324a and 324d; text segment 322c is a summary of media sources 324a and 324d; and text segment 322d is a summary of media sources 324a, 324b, and 324d.

Figure 4A:
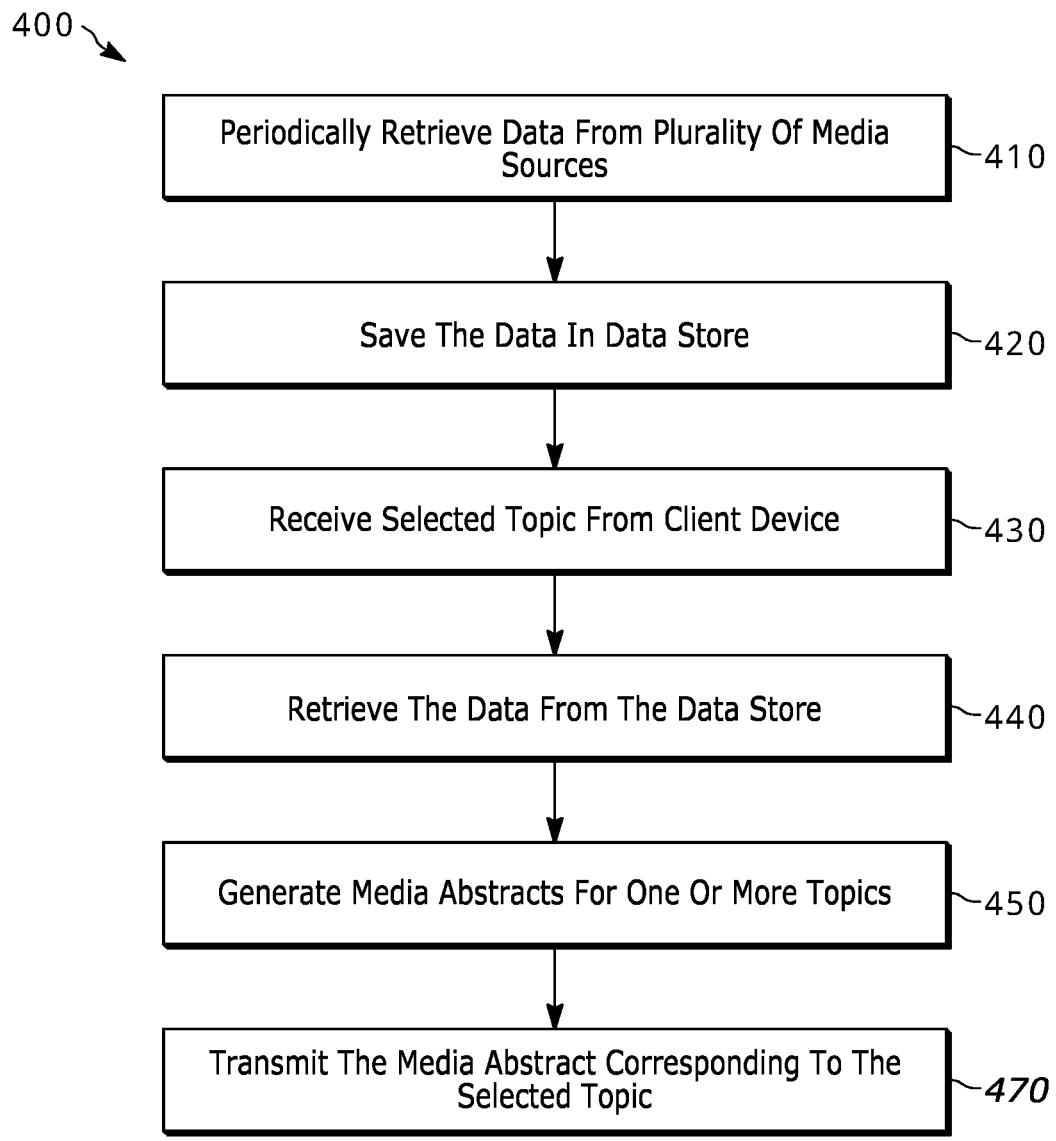
FIG. 4A illustrates a computer-implemented method for providing a media abstract for a selected topic.

Exemplary Computer-Implemented Method for Providing a Media Abstract for a Selected Topic FIG. 4A illustrates a flow diagram of an exemplary computer-implemented method 400 for providing a media abstract for a selected topic. One or more steps of the computer-implemented method 400 may be implemented as a set of instructions stored on a computer-readable memory and executable on one or more processors. The computer-implemented method 400 of FIG. 4A may be implemented via a system, such as the server 110 and/or the client devices 102.

In one aspect, the computer-implemented method 400 may include training a language model service using a set of labeled training data. The computer-implemented method 400 may also include retrieving a set of unlabeled data from the data store and labeling the set of unlabeled data to generate the set of labeled training data.

In one aspect, the computer-implemented method 400 may include at block 410 periodically retrieving data from a plurality of media sources 130. The data may be retrieved hourly, daily, or some other frequency. The media sources 130 may comprise text data.

One or more of the media sources 130 may comprise audio and/or video data. The computer-implemented method 400 may include transcribing the audio and/or video data into text data.

In one aspect, the computer-implemented method 400 may include at block 420 saving the text data from the plurality of media sources 130 into the data store 118. The data store 118 may comprise the database 224 and/or cloud storage 226.

In one aspect, the computer-implemented method 400 may include at block 430 receiving a selected topic from a client device 102. The computer-implemented method 400 may also include at block 430 receiving one or more aspect keywords from the client device 102.

In one aspect, the computer-implemented method 400 may include at block 440 retrieving the text data from the data store 118.

In one aspect, the computer-implemented method 400 may include at block 450 generating one or more media abstracts for one or more topics. The media abstracts may comprise a plurality of text segments that transform the text data. Transforming the text data may include interleaving the text data from the plurality of media sources 130. The media abstract may comprise a generated sequence of text that is new compared to the text data and/or the information in the plurality of media sources 130.

In one aspect, the computer-implemented method 400 may include generating a sentiment analysis. The sentiment analysis may be generated for each of the media sources 130 and/or for the media abstract. The sentiment analysis may be a percentage and/or a number of positive, negative, and/or neutral sentiments. The sentiment analysis may include historical sentiment data over a period of time. The sentiment analysis may comprise annotating one or more text segments with a positive sentiment indication or a negative sentiment indication.

In one aspect, the computer-implemented method 400 may include at block 470 transmitting the media aspect corresponding to the selected topic to the client device 102.

It should be understood that not all blocks of the exemplary flow diagram 400 are required to be performed. Moreover, the exemplary flow diagram 400 is not mutually exclusive (i.e., block(s) from exemplary flow diagram 400 may be performed in any particular implementation).

Exemplary Computer-Implemented Method for Generating a Media Abstract

Figure 4B:
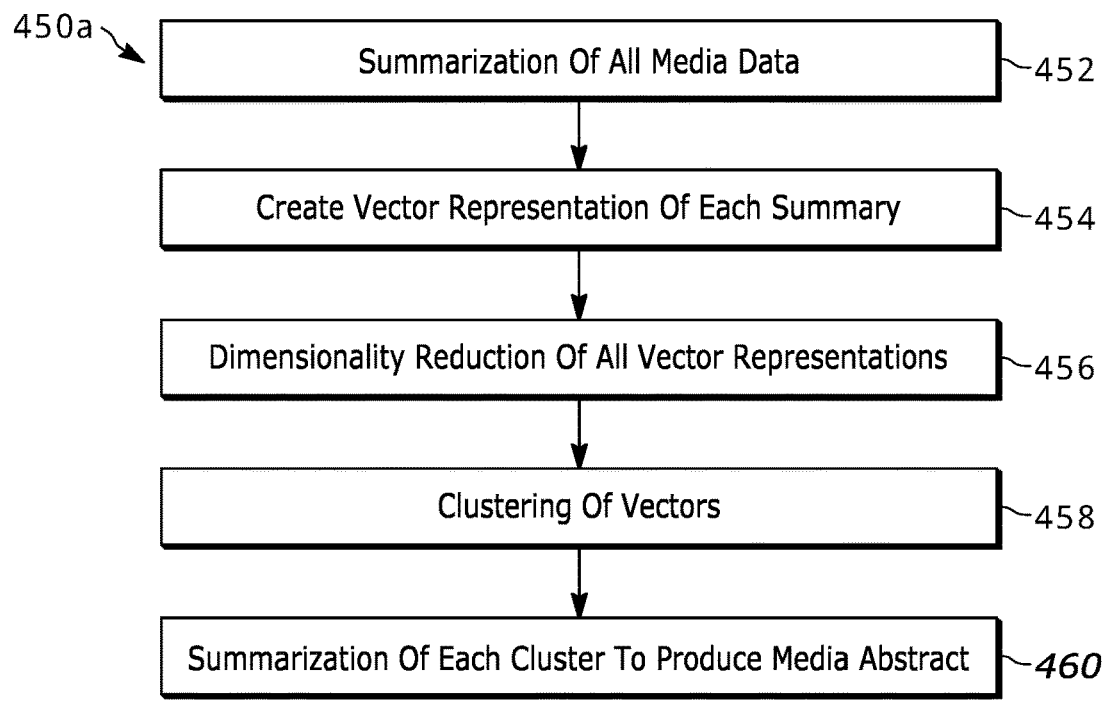
FIG. 4B illustrates a computer-implemented method for generating a media abstract.

FIG. 4B illustrates a flow diagram of an exemplary computer-implemented method 450a for generating a media abstract. One or more steps of the computer-implemented method 450a may be implemented as a set of instructions stored on a computer-readable memory and executable on one or more processors. The computer-implemented method 450a of FIG. 4B may be implemented via a system, such as the server 110 and/or the client devices 102.

In one aspect, the computer-implemented method 450a may include at block 452 summarizing all media data. Summarizing all media data may comprise generating a media summary for each of the plurality of media sources 130. A language model may perform the summarization. The media summaries may be generated by a transformer-based model, such as an autoregressive model, an autoencoding model, or a sequence-to-sequence model, LSTM, GRU, CNN, or a fine-tuned model, e.g., BRIO. Each media summary may be 150 words or less.

In one aspect, the computer-implemented method 450a may include at block 454 creating a vector representation of each summary. Creating a vector representation of each summary may comprise generating an embedding for each media summary using sentence transforms, e.g., SBERT. The embeddings may be of dimension 768.

In one aspect, the computer-implemented method 450a may include at block 456 reducing the dimensionality of all vector representations. Dimensionality reduction of all vector representations may comprise reducing the dimensionality of each embedding. Dimensionality reduction may be performed using an unsupervised learning technique, e.g., PCA, LDA, GDA, or UMAP. The 768 dimension embeddings may be reduced to dimension 5.

In one aspect, the computer-implemented method 450a may include at block 458 clustering of vectors. Clustering of vectors may comprise clustering the embeddings to form a plurality of groupings. Each group may contain a set of all similar embeddings. Similarity may be determined by Euclidean distance, cosine similarity, dot product, vector databases, random projection, product quantization, locality-sensitive hashing, or nearest neighbor search, e.g., HNSW. The clustering may be performed by centroid-based, density-based, e.g., DBSCAN, distribution-based, or hierarchical clustering.

In one aspect, the computer-implemented method 450a may include amalgamating the text for each group.

In one aspect, the computer-implemented method 450a may include at block 460 summarization of each cluster to produce media abstract. Summarization of each cluster to produce media abstract may comprise summarizing the amalgamated text. A language model may perform the summarization. The media abstract may be generated by a transformer-based model, such as an autoregressive model, an autoencoding model, or a sequence-to-sequence model, e.g., LSTM, GRU, or CNN. The media summary may be 150 words or less.

Figure 4C:
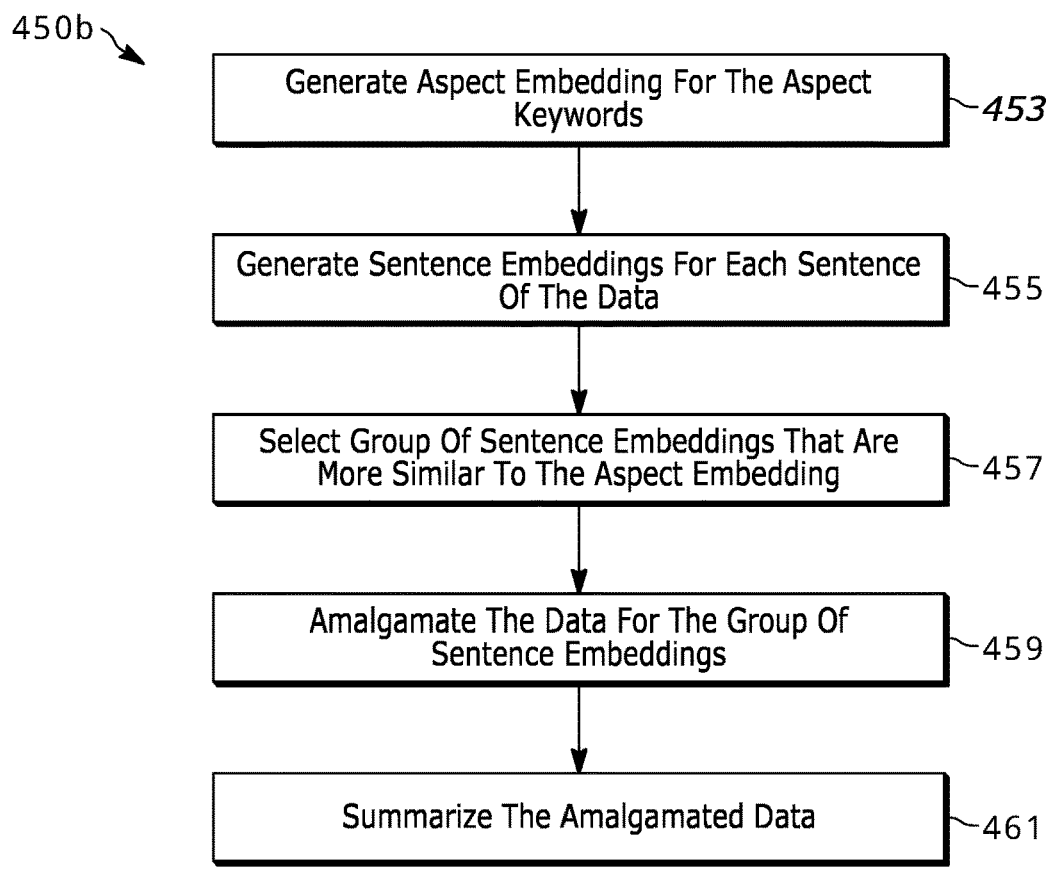
FIG. 4C illustrates a computer-implemented method for generating an aspect-specific media abstract.

Exemplary Computer-Implemented Method for Generating an Aspect-Specific Media Abstract FIG. 4C illustrates a flow diagram of an exemplary computer-implemented method 450b for generating an aspect-specific media abstract. One or more steps of the computer-implemented method 450b may be implemented as a set of instructions stored on a computer-readable memory and executable on one or more processors. The computer-implemented method 450b of FIG. 4C may be implemented via a system, such as the server 110 and/or the client devices 102.

In one aspect, the computer-implemented method 450b may include at block 453 creating an aspect embedding for the one or more aspect keywords. Creating an aspect embedding may comprise generating an embedding for the aspect keywords using sentence transforms, e.g., SBERT. The aspect embeddings may be of a dimension of 364, 768, 1536, or some other dimension.

In one aspect, the computer-implemented method 450b may include at block 455 creating sentence embeddings for each sentence of the data. Creating sentence embeddings may comprise generating embeddings for the sentences using sentence transforms, e.g., SBERT. The sentence embeddings may be of a dimension of 364, 768, 1536, or some other dimension.

In one aspect, the computer-implemented method 450b may include at block 457 selecting a group of sentence embeddings that are similar to the aspect embedding. Similarity may be determined by Euclidean distance, cosine similarity, dot product, vector databases, random projection, product quantization, locality-sensitive hashing, or nearest neighbor search, e.g., HNSW. A group of sentences similar to the aspect embedding, e.g., within a small radius, may be extracted.

In one aspect, the computer-implemented method 450b may include at block 459 amalgamating the text data for the group of sentence embeddings.

In one aspect, the computer-implemented method 450b may include at block 461 summarization of the text data to produce the aspect-specific media abstract. A language model may perform the summarization. The aspect-specific media abstract may be generated by a transformer-based model, such as an autoregressive model, an autoencoding model, or a sequence-to-sequence model, e.g., LSTM, GRU, or CNN. The aspect-specific media summary may be 150 words or less.

ADDITIONAL CONSIDERATIONS

Although the text herein sets forth a detailed description of numerous different embodiments, it should be understood that the legal scope of the invention is defined by the words of the claims set forth at the end of this patent. The detailed description is to be construed as exemplary only and does not describe every possible embodiment, as describing every possible embodiment would be impractical, if not impossible. One could implement numerous alternate embodiments, using either current technology or technology developed after the filing date of this patent, which would still fall within the scope of the claims.

It should also be understood that, unless a term is expressly defined in this patent using the sentence "As used herein, the term 'XYZ' is hereby defined to mean . . . " or a similar sentence, there is no intent to limit the meaning of that term, either expressly or by implication, beyond its plain or ordinary meaning, and such term should not be interpreted to be limited in scope based upon any statement made in any section of this patent (other than the language of the claims). To the extent that any term recited in the claims at the end of this disclosure is referred to in this disclosure in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based upon the application of 35 U.S.C. § 112(f).

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in exemplary configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (code embodied on a non-transitory, tangible machine-readable medium) or hardware. In hardware, the routines, etc., are tangible units capable of performing certain operations and may be configured or arranged in a certain manner. In exemplary embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC) to perform certain operations). A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of exemplary methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some exemplary embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of geographic locations.

Unless specifically stated otherwise, discussions herein using words such as processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment may be included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also includes the plural unless it is obvious that it is meant otherwise.

Upon reading this disclosure, those of skill in the art will appreciate still additional alternative structural and functional designs for the approaches described herein. Therefore, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

The particular features, structures, or characteristics of any specific embodiment may be combined in any suitable manner and in any suitable combination with one or more other embodiments, including the use of selected features without corresponding use of other features. In addition, many modifications may be made to adapt a particular application, situation or material to the essential scope and spirit of the present invention. It is to be understood that other variations and modifications of the embodiments of the present invention described and illustrated herein are possible in light of the teachings herein and are to be considered part of the spirit and scope of the present invention.

While the preferred embodiments of the invention have been described, it should be understood that the invention is not so limited and modifications may be made without departing from the invention. The scope of the invention is defined by the appended claims, and all devices that come within the meaning of the claims, either literally or by equivalence, are intended to be embraced therein.

It is therefore intended that the foregoing detailed description be regarded as illustrative rather than limiting, and that it be understood that it is the following claims, including all equivalents, that are intended to define the spirit and scope of this invention.

What is claimed is:

1. A system for providing a media abstract for a selected topic, wherein the media abstract includes information obtained from a plurality of media sources, comprising:
    a server comprising one or more processors and a memory storing a data collection service and a language model service trained on a plurality of data sources,
    wherein the data collection service, when executed by the one or more processors, causes the one or more processors to:
        periodically retrieve data from the plurality of media sources, and
        save the data in a data store,
    wherein the language model service, when executed by the one or more processors, causes the one or more processors to:
        receive the selected topic from a client device,
        retrieve the data from the data store,
        generate, one or more media abstracts for one or more topics comprising a plurality of text segments transforming the data, wherein transforming the data comprises interleaving text from the plurality of media sources, and wherein the one or more media abstracts comprise a generated sequence of text that is new compared to the information in the plurality of media sources, wherein generating the one or more media abstracts comprises:
            generating from the data a media summary for each of the plurality of media sources,
            generating an embedding for each media summary using sentence transforms,
            reducing the dimensionality of each embedding,
            clustering the embeddings to form a plurality of groupings,
            amalgamating the text for each grouping, and
            summarizing the amalgamated text; and
        transmit the media abstract corresponding to the selected topic to the client device.

2. The system of claim 1, wherein each text segment of the plurality of text segments links back to one or more of the plurality of media sources.

3. The system of claim 1, wherein the plurality of media sources comprises:
    a first source comprising a text format, and
    a second source comprising a video or audio format, and
    wherein the data collection service, when executed by the one or more processors, further causes the one or more processors to:
        transcribe the data from the second source into the text format.

4. The system of claim 1, wherein the language model service, when executed by the one or more processors, further causes the one or more processors to:
    generate a sentiment analysis, and
    transmit the sentiment analysis to the client device.

5. The system of claim 1, wherein the memory stores a training service that, when executed by the one or more processors, causes the one or more processors to:
    train the language model service using a set of labeled training data by performing maximum likelihood estimation and/or contrastive learning.

6. The system of claim 5, wherein the training service, when executed by the one or more processors, further causes the one or more processors to:
    update the language model service using hyperparameter tuning, gradient descent, or regularization.

7. The system of claim 1, wherein the language model service, when executed by the one or more processors, further causes the one or more processors to:
    receive one or more aspect keywords from the client device, and
    wherein the media abstract comprises a generated sequence of text summarizing the data with respect to the aspect keywords.

8. The system of claim 7, wherein generating the one or more media abstracts comprises:
    generating an aspect embedding for the one or more aspect keywords using sentence transforms,
    generating a sentence embedding for each sentence of the data using sentence transforms,
    selecting a group of one or more sentence embeddings that are most similar to the aspect embedding,
    amalgamating the data for the group of one or more sentence embeddings, and
    summarizing the amalgamated data.

9. A computer-implemented method for providing a media abstract for a selected topic, wherein the media abstract includes information obtained from a plurality of media sources, the method comprising:
    periodically retrieving, with one or more processors, data from the plurality of media sources;
    saving, with the one or more processors, the data in a data store;
    receiving, with the one or more processors, the selected topic from a client device;
    retrieving, with the one or more processors, the data from the data store;
    generating, with the one or more processors, one or more media abstracts for one or more topics comprising a plurality of text segments transforming the data, wherein transforming the data comprises interleaving text from the plurality of media sources, and wherein the one or more media abstracts comprise a generated sequence of text that is new compared to the information in the plurality of media sources, wherein generating the one or more media abstracts comprises:
generating from the data a media summary for each of the plurality of media sources,
generating an embedding for each media summary using sentence transforms,
reducing the dimensionality of each embedding,
clustering the embeddings to form a plurality of groupings,
amalgamating the text for each grouping, and
summarizing the amalgamated text; and
transmitting, with the one or more processors, the media abstract corresponding to the selected topic to the client device.

10. The method of claim 9, wherein each text segment of the plurality of text segments links back to one or more of the plurality of media sources.

11. The method of claim 9, wherein the plurality of media sources comprises:
a first source comprising a text format, and
a second source comprising a video or audio format,
wherein the method further comprises:
transcribing the data from the second source into the text format.

12. The method of claim 9, further comprising:
generating, with the one or more processors, a sentiment analysis; and
transmitting, with the one or more processors, the sentiment analysis to the client device.

13. The method of claim 12, wherein the sentiment analysis comprises a plurality of sentiment scores over a specified time period.

14. The method of claim 13, wherein the sentiment analysis comprises an annotation of one or more text segments with a positive sentiment indication or a negative sentiment indication.

15. The method of claim 9, further comprising:
receiving one or more aspect keywords from the client device,
wherein the media abstract comprises a generated sequence of text summarizing the data with respect to the aspect keywords.

16. The method of claim 15, wherein generating the one or more media abstracts comprises:
generating an aspect embedding for the one or more aspect keywords using sentence transforms,
generating a sentence embedding for each sentence of the data using sentence transforms,
selecting a group of one or more sentence embeddings that are most similar to the aspect embedding,
amalgamating the data for the group of one or more sentence embeddings, and
summarizing the amalgamated data.

* * * * *